United States Patent
Tame et al.

(10) Patent No.: US 6,905,173 B2
(45) Date of Patent: Jun. 14, 2005

(54) EXTERNAL CONTROL OF RECLINER ASSEMBLY BACKGROUND OF THE INVENTION

(75) Inventors: Omar D. Tame, West Bloomfield, MI (US); Radesh Vangipuram, Farmington Hills, MI (US); Rabindranath Persad, Brighton, MI (US); Stephen P. Tokarz, New Boston, MI (US); Lei Cao, Farmington Hills, MI (US); Ashok K. Sahi, West Bloomfield, MI (US)

(73) Assignee: Magna Seating Systems Inc., Aurora (CA)

( * ) Notice: Subject to any disclaimer, the term of this patent is extended or adjusted under 35 U.S.C. 154(b) by 0 days.

(21) Appl. No.: 10/451,137
(22) PCT Filed: Dec. 20, 2001
(86) PCT No.: PCT/US01/50260
§ 371 (c)(1),
(2), (4) Date: Dec. 22, 2003
(87) PCT Pub. No.: WO02/49873
PCT Pub. Date: Jun. 27, 2002

(65) Prior Publication Data
US 2004/0090102 A1 May 13, 2004

(30) Foreign Application Priority Data
Dec. 20, 2000 (US) .......................................... 60/257,279

(51) Int. Cl.[7] ................................................. B60N 2/02
(52) U.S. Cl. ................................ 297/378.12; 297/378.1
(58) Field of Search ......................... 297/378.12, 378.1, 297/378.14

(56) References Cited

U.S. PATENT DOCUMENTS 3,848,923 A    11/1974    Dehler
3,953,069 A  *  4/1976    Tamura et al. .............. 297/367

(Continued)

FOREIGN PATENT DOCUMENTS

DE    195 14 380 A1    4/1995
EP    0 938 997 A2    2/1999

(Continued)

Primary Examiner—Peter M. Cuomo
Assistant Examiner—Stephen D'Adamo
(74) Attorney, Agent, or Firm—Clark Hill PLC (57) ABSTRACT

A seat assembly comprising a seat cushion, a seat back and a recliner assembly operatively interconnecting the seat back to the seat cushion. The recliner assembly allows pivotal adjustment of the seat back relative to the seat cushion between one of a plurality of reclined seating positions and a stowed position. The recliner assembly is selectively moveable between locked and unlocked states. An input shaft is operatively assembled to the recliner assembly for switching the recliner assembly between the locked and unlocked states. The seat assembly further comprising a mechanism externally engagable with the input shaft of the recliner assembly for adjusting the angular position of the seat back in one of the reclined seating positions and for maintaining the input shaft in the unlocked position while the seat back is pivoted from one of the reclined seating positions to the stowed position. First and second levers are pivotally mounted to the seat cushion and moveable between unreleased and released positions. A guide pin extends from the first lever through a slot in the second lever to synchronize movements of the first and second levers between respective unreleased and released positions. The second lever includes a cam surface for actuating the input shaft between the locked position and unlocked positions when the second lever is moved between the unreleased and released positions, respectively. The second lever further has a flanged tab. A flanged guide extends from the seat back to engage the tab of the second lever in the released position, and by such engagement, maintains the second lever in the released position while moving the seat back between the reclined seating positions and the stowed position.

17 Claims, 9 Drawing Sheets

U.S. PATENT DOCUMENTS

| | | | |
|---|---|---|---|
| 4,035,021 A | | 7/1977 | Krug |
| 4,146,267 A | | 3/1979 | Mori et al. |
| 4,268,086 A | | 5/1981 | Okuyama |
| 4,484,779 A | * | 11/1984 | Suzuki ........................ 297/326 |
| RE32,884 E | | 3/1989 | Kluting et al. |
| 4,874,205 A | | 10/1989 | Arefinejad et al. |
| 5,383,710 A | | 1/1995 | Premji |
| 5,507,561 A | * | 4/1996 | Fourrey et al. ........ 297/378.12 |
| 5,558,403 A | | 9/1996 | Hammound et al. |
| 5,718,481 A | | 2/1998 | Robinson |
| 5,733,008 A | | 3/1998 | Tame |
| 5,938,286 A | | 8/1999 | Jones et al. |
| 6,139,105 A | * | 10/2000 | Morgos et al. ........ 297/378.12 |
| 6,209,955 B1 | | 4/2001 | Seibold |
| 6,328,381 B1 | * | 12/2001 | Smuk ......................... 297/365 |
| 6,435,616 B1 | * | 8/2002 | Travis et al. ............ 297/378.12 |
| 6,454,355 B2 | * | 9/2002 | Biletskiy ................ 297/378.12 |

FOREIGN PATENT DOCUMENTS

| | | | | |
|---|---|---|---|---|
| EP | WO 01/76907 A1 | | 10/2001 | |
| JP | 03284224 A | * | 12/1991 | ........... A47C/1/025 |
| WO | WO 00/55005 | | 9/2000 | |

* cited by examiner

EXTERNAL CONTROL OF RECLINER ASSEMBLY BACKGROUND OF THE INVENTION

BACKGROUND OF THE INVENTION

1. Field of the Invention

The subject invention relates to a mechanism for externally controlling a recliner assembly used to selectively lock the angular position of a seat back relative to a seat cushion of an automotive seat, and more particularly, to a mechanism which holds the recliner assembly in an unlocked state while seat back is moved between one of a plurality of reclined positions and a stowed cargo position.

2. Description of the Prior Art

Automotive vehicles include seat assemblies for supporting an occupant in the vehicle. A typical seat assembly comprises a seat cushion and a seat back interconnected to the seat cushion by a recliner assembly. The recliner assembly allows pivotal adjustment of the seat back relative to the seat cushion between a plurality of reclined positions.

Recliner assemblies are well known in the vehicle seating art and are commonly used to pivotally connect a seat back to a seat cushion. Recliner assemblies commonly include a fixed flange secured to the seat cushion and a mobile flange secured to the seat back. The mobile flange is pivotally coupled to the fixed flange. A locking mechanism selectively locks the fixed and mobile flanges. An input shaft is pivotally journaled to the locking mechanism for actuating the locking mechanism between locked and unlocked states. Typically a release handle extends radially from the input shaft to allow a user to manually actuate the locking mechanism, in order to adjust the angular position of the seat back.

It is often desirable to have a seat assembly with a seat back that is moveable from a reclined seating position to a forwardly stowed position to extend the cargo carrying capacity of the vehicle. Recliner assemblies known in the art are easily adapted to allow such adjustment of the seat back. However, the user typically must maintain the recliner assembly in the unlocked state manually with the release handle throughout adjustment of the seat back between one of the reclined seating positions and the stowed position. An example of such a recliner assembly is disclosed in U.S. Pat. No. 5,718,481, which issued to Robinson on Feb. 17, 1998.

Therefore, it remains desirable to provide a mechanism for externally controlling the recliner assembly that allows the seat back to be adjusted between the plurality of reclined seating positions and the stowed position without further need to manually maintain the recliner assembly in the unlocked state.

SUMMARY OF THE INVENTION

The invention relates to a seat assembly for supporting an occupant within an automotive vehicle. The seat assembly comprises a seat cushion interconnected to the vehicle and a seat back pivotally interconnected to the seat cushion for movement between a plurality of seating positions and a stowed position overlying the seat cushion. A recliner assembly extends between the seat cushion and the seat back and is movable between a locked state preventing pivotal movement of the seat back relative to the seat cushion and an unlocked state allowing pivotal movement of the seat back relative to the seat cushion. A lever is pivotally assembled to the seat cushion for movement between an unreleased position and a released position and operatively interconnected to the recliner assembly for externally actuating the recliner assembly between the locked state and the unlocked state when moving the lever between the unreleased position and released position, respectively. A bracket extends outwardly from the seat back for movement therewith and is engagable with the lever in the released position during movement of the seat back between the plurality of seating positions and the stowed position to maintain the lever in the released position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
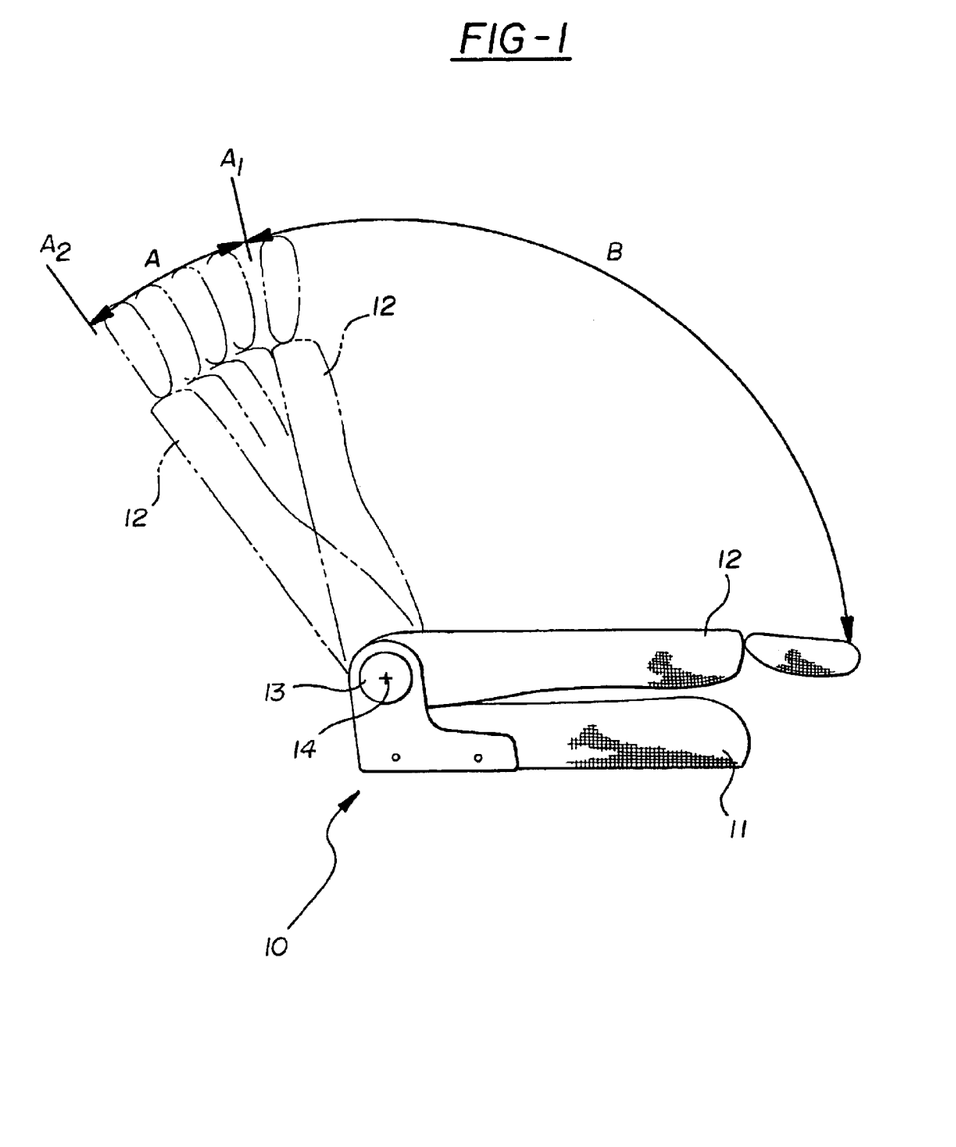
FIG. 1 is a perspective view of an automotive seat assembly incorporating a recliner assembly and a mechanism for externally actuating the recliner assembly according to one embodiment of the invention.

Referring to the Figures, FIG. 1 discloses a seat assembly 10 for supporting an occupant in an automotive vehicle. The seat assembly 10 includes a seat cushion 11 and a seat back 12. The seat assembly 10 is releasably locked into the vehicle by any suitable floor latching mechanism, such as the mechanism disclosed in U.S. Pat. No. 5,671,965. A recliner assembly 13 interconnects the seat back 12 and the seat cushion 11. The recliner assembly 13 allows angular adjustment of the seat back 12 relative to the seat cushion 11 about a pivot axis 14 between a full forward reclined seating position A1, a rearward reclined seating position A2, and one of a plurality of reclined seating positions A therebetween. Further, the seat back 12 may be moved between one of the reclined seating positions A, A1, A2 and a stowed position B. Preferably, the seat back 12 is biased towards the stowed position B by any suitable biasing means, such as a coil spring or torque rod. The recliner assembly 13 is biased in a locked state, wherein the angular position of the seat back 12 relative to the seat cushion 11 is maintained. The recliner assembly 13 can be actuated between the locked state and an unlocked state, wherein the seat back 12 is freely pivotable relative to the seat cushion 11. An example of such a recliner is shown PCT application CA 99/00653, published Feb. 10, 2000, which is incorporated herein by reference in its entirety.

Figure 2:
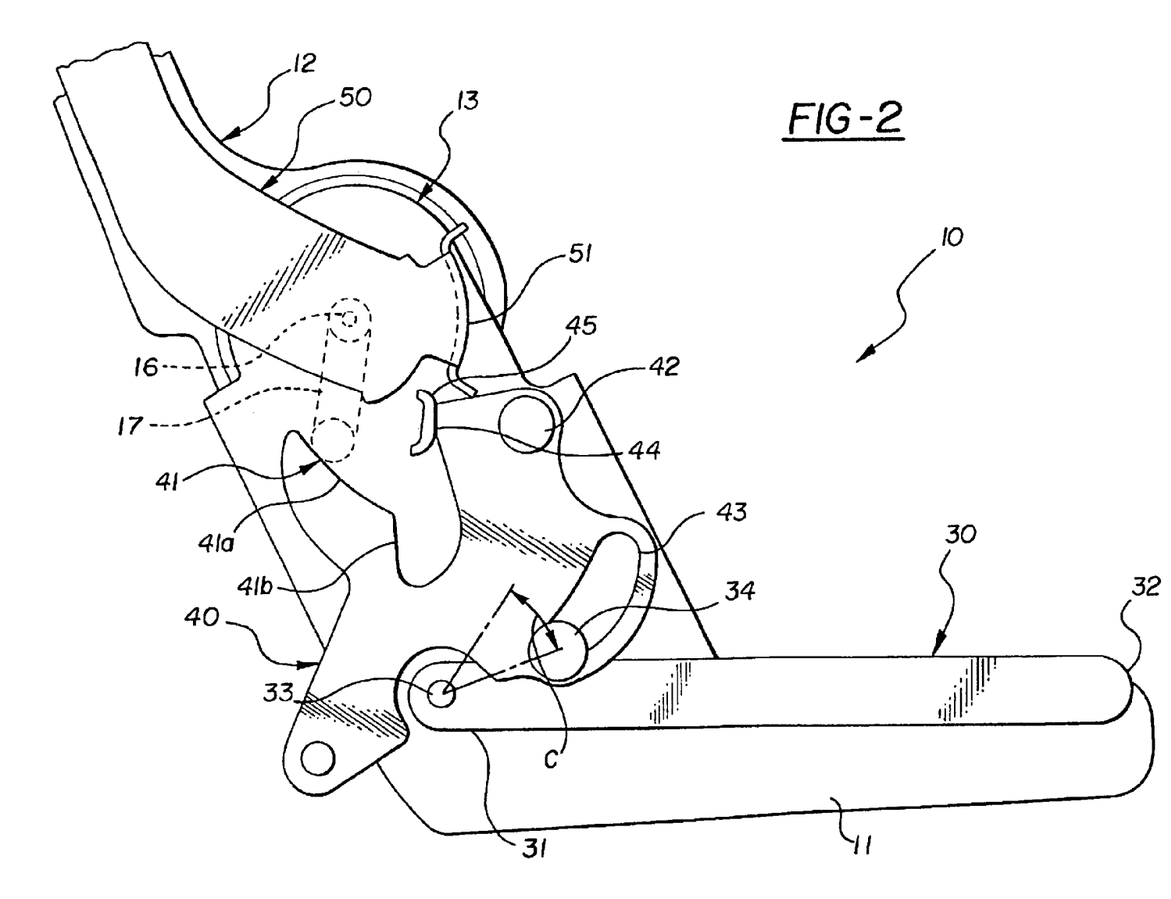
FIG. 2 is an enlarged side view of the mechanism for externally actuating the recliner assembly with a seat back in a reclined seating position.

Referring to FIG. 2, an input shaft 16 extends axially from the recliner assembly 13 and is moveable between an unreleased position and a released position. Pivotal movement of the input shaft 16 between the unreleased and released positions actuates the recliner assembly 13 between the locked and locked states, respectively. A lever arm 17 extends radially from the input shaft 16 for externally actuating the recliner assembly 13. Preferably, the input shaft 16 is biased to the unreleased position by any suitable biasing member, such as by a coil spring.

The seat assembly 10 further includes an external control mechanism allowing for actuation of the recliner assembly 13 between the locked and unlocked states. Further, the external control mechanism maintains the recliner assembly 13 in the unlocked state while the seat back 12 is moved between one of the reclined seating positions A, A1, A2 and the stowed position B. More specifically, a handle or first lever 30 extends between a proximal end 31 pivotally assembled to the seat cushion 11 by a first pivot pin 33 and an opposite distal end 32. The first lever 30 is rotatable between an unreleased position, shown in FIG. 2, and a released position, shown in FIG. 3. A guide pin 34 projects axially from between the proximal and distal ends 31, 32 of the first lever 30. When the first lever 30 is rotated about the first pivot pin 33, the guide pin 34 follows a radial swing path, indicated as C in FIG. 2.

A second lever 40 is pivotally assembled to the seat cushion 11 by a second pivot pin 42 spaced apart from the first pivot pin 33. Similar to the first lever 30, the second lever 40 is rotatable between an unreleased position, shown in FIG. 2, and a released position, shown in FIG. 3. The second lever 40 is further rotatable between the released position and an extended position to release the floor latching mechanism in conjunction with movement of the seat back 12 towards the stowed position B. A bowden cable, or the like, extends between and interconnects the second lever 40 and the floor latching mechanism. Movement of the second lever 40 between the released and extended positions releases the floor latching mechanism. A longitudinal guide slot 43 is formed in the second lever 40 for receiving the guide pin 34 therethrough and is aligned generally normal to the swing path C of the guide pin 34. The guide pin 34 while slidably engaged with the guide slot 43 provides generally synchronous movement of both the first and second levers 30, 40 between the respective unreleased and released positions. A cam surface 41 formed in the second lever 40 extends between upper and lower portions 41a, 41b for actuating the lever arm 17. The upper portion 41a actuates the lever arm 17 when the second lever 40 rotates between the unreleased and released positions. The lever arm 17 engages the lower portion 41b of the cam surface 41 when the lever 40 rotates between the released and extended positions. While engaged with the lower portion 41b, the lever 40 remains in the released position.

A flanged tab 44 extends outwardly from the second lever 40 for engaging the seat back 12. More specifically, a guide bracket 50 fixedly assembled to the seat back 12 includes an arcuate flanged guide 51 radially spaced apart from the pivot axis 14. In the released position, the second lever 40 presents the flanged tab 44 for engaging the flanged guide 51. The flanged tab 44 of the second lever 40 slidably rides the flanged guide 51 to maintain the second lever 40 in the released position during movement of the seat back 12 between the full forward reclined seating position A1 and the stowed position B.

Figure 3:
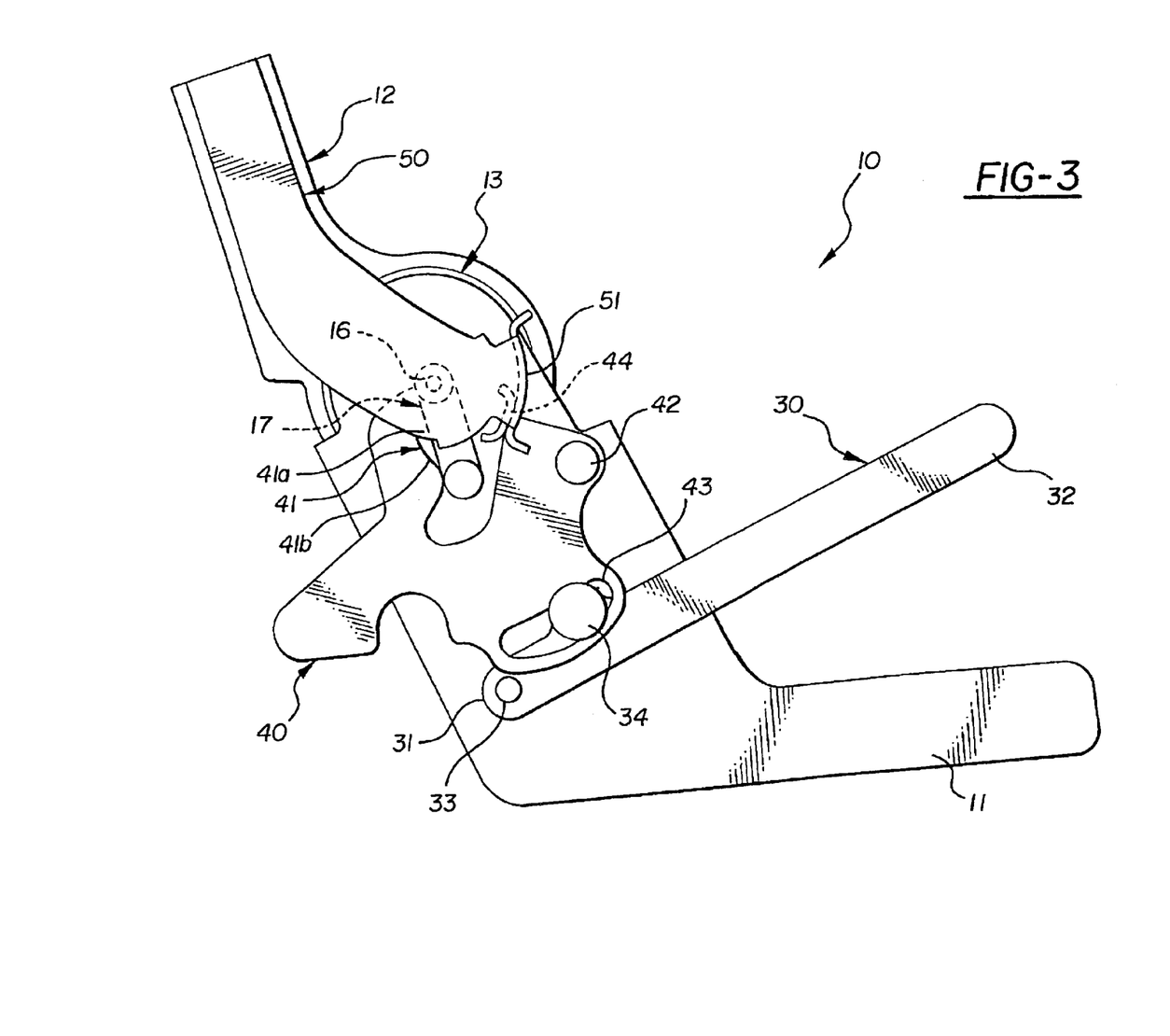
FIG. 3 is an enlarged side view of the mechanism just prior to moving the seat back from the reclined seating position to a stowed position.

In operation, a user adjusts the angular position of the seat back 12 by holding the first lever 30 in the released position, as shown in FIG. 3. The guide pin 34 acting upon the edges of the guide slot 43 rotates the second lever 40 to the released position. As the second lever 40 rotates to the released position, the cam surface 41 engages the lever 17 to rotate the input shaft 16 from the unreleased position to the released position. In response, the recliner assembly 13 moves from the locked state to the unlocked state, wherein the seat back 12 is freely movable between the reclined seating positions A, A1, A2 and the stowed position B. The recliner assembly 13 is allowed to return under internal bias to the locked state to lock the seat back 12 once adjusted to a desired position. More specifically, as the input shaft 16 returns to the unreleased position, the lever arm 17 exerts force on the cam surface 41 to move the second lever 40 towards the unreleased position. Concurrently, the edges of the guide slot 43 act upon the guide pin 34 to move the first lever 30 to the unreleased position. Alternatively, either or both of the first and second levers 30, 40 may be biased to the respective unreleased positions, by any conventional biasing means, such as by a tensioned helical spring.

The seat back 12 can be moved from any one of the reclined seating positions A, A1, A2 to the stowed position B by rotating the second lever 40 to the released position either directly or by lifting upwardly on the first lever 30. As described above, the input shaft 16 pivots to the released position to unlock the recliner assembly 13. The seat back 12 is freely rotatable relative to the seat cushion 11. Further, with the second lever 40 in the unreleased position, the flanged tab 44 is presented for engaging the flanged guide 51. As the seat back 12 rotates between the full forward reclined seating position A1 and the stowed position B, the flanged guide 51 engages the flanged tab 44 to maintain the second lever 40 in the released position. Thus, with the flanged tab 44 engaged with the flanged guide 51, it is no longer necessary to manually hold either of the first or second levers 30, 40 in the respective released positions.

Figure 4:
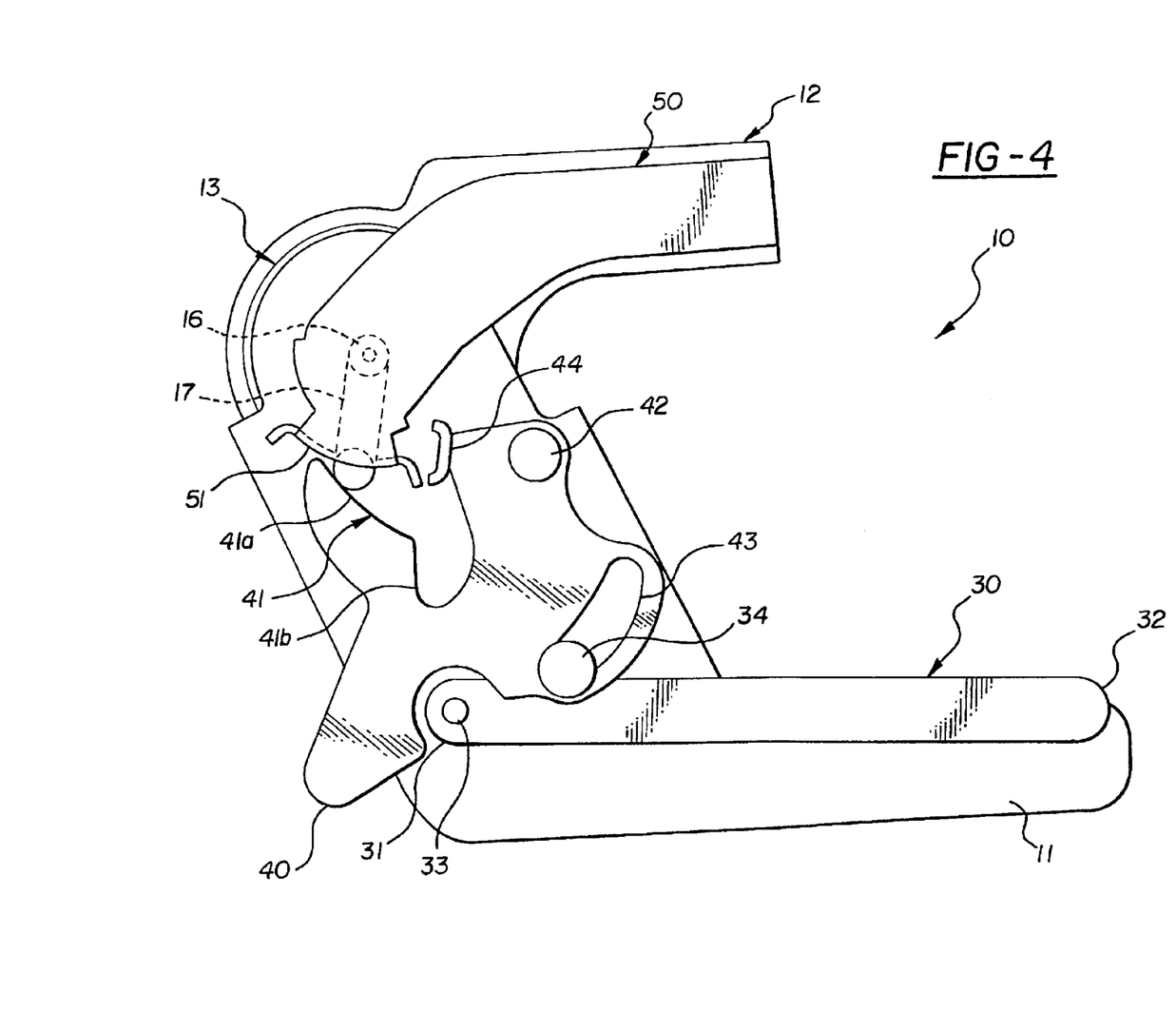
FIG. 4 is an enlarged side view of the mechanism with the seat back locked in the stowed position.

When the seat back 12 reaches the stowed position B, the flanged guide 51 falls out of engagement with the flanged tab 44. The first and second levers 30, 40 and the input shaft 16 all return to their respective unreleased positions. The recliner assembly 13 returns to the locked state to lock the seat back 12 in the stowed position B against the seat cushion 11, as shown in FIG. 4.

Similarly, the seat back 12 can be moved from the stowed position B to the full forward reclined seating position A1 by first rotating the second lever 40 to the released position either directly or by lifting upwardly on the first lever 30. In response, the input shaft 16 pivots to the released position to actuate the recliner assembly 13 to the unlocked state. The seat back 12 is then freely rotatable relative to the seat cushion 11. With the second lever 40 in the unreleased position, the flanged tab 44 is presented for engaging the flanged guide 51. While the seat back 12 rotates between the stowed position B and the full forward reclined seating position A1, the flanged guide 51 engages the flanged tab 44 to maintain the second lever 40 in the released position. When the seat back 12 reaches the full forward reclined seating position A1, the flanged guide 51 falls out of engagement with the flanged tab 44. The first and second levers 30, 40 and the input shaft 16 all return to the respective unreleased positions. The recliner assembly 13 returns to the locked state to lock the seat back 12 in the full forward reclined seating position A1.

Figure 5:
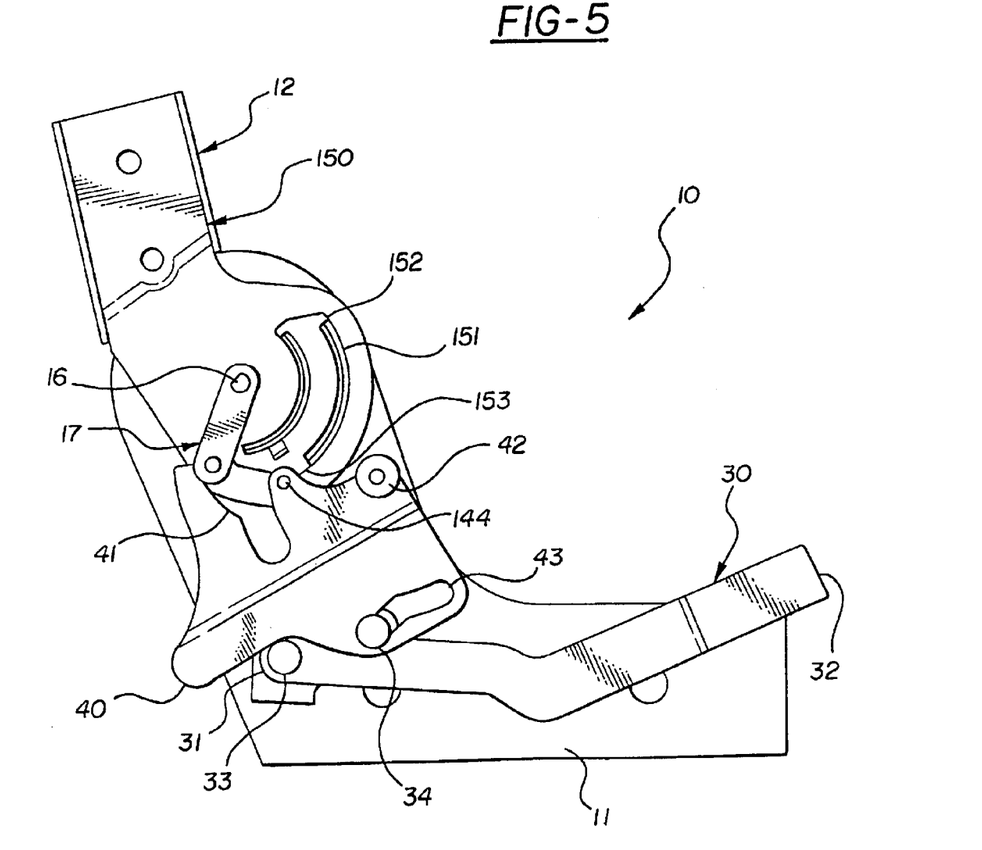
FIG. 5 is an enlarged side view of the mechanism for externally actuating the recliner assembly, according to a second embodiment of the invention, with the seat back in a reclined seating position.
Figure 6:
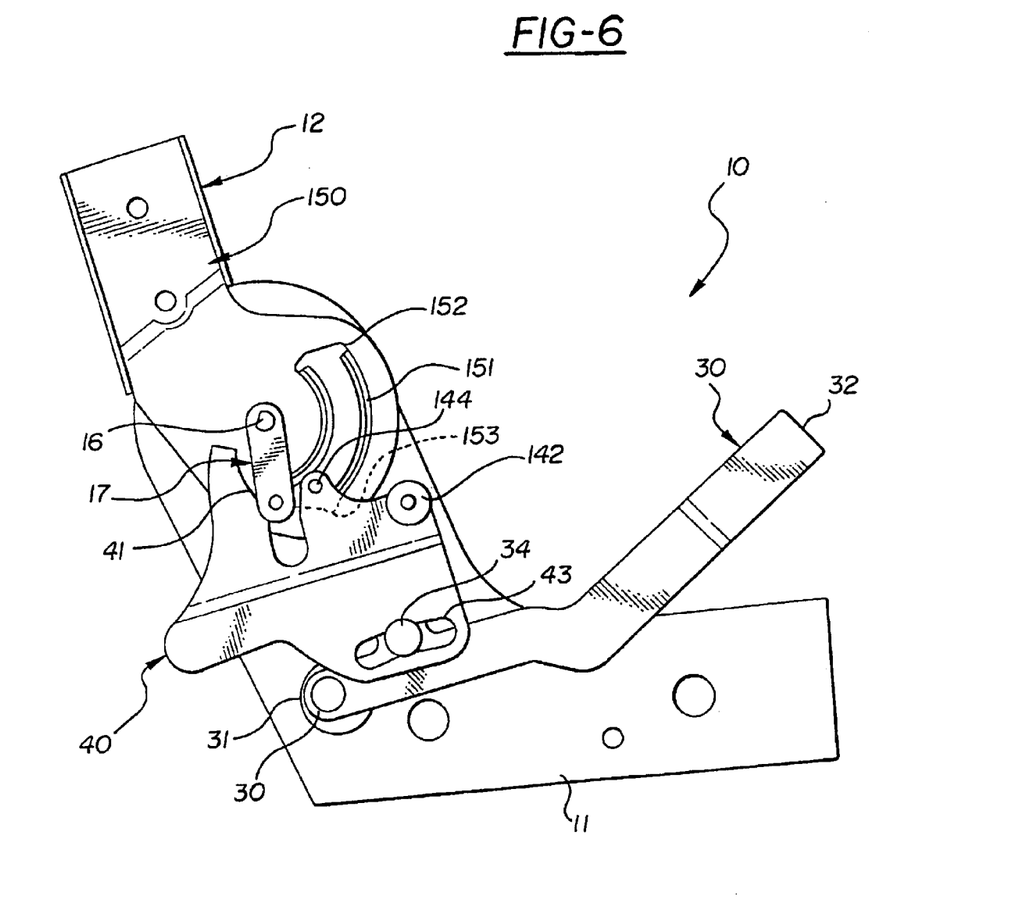
FIG. 6 is an enlarged side view of the mechanism according to the second embodiment just prior to moving the seat back from the reclined seating position to a stowed position.

Referring to FIGS. 5 and 6, an alternative embodiment of the invention is shown with the seat back 12 in a reclined seating position. The seat back 12 is moveable between the reclined seating position and a stowed position, shown in FIGS. 7 and 8. A guide pin 144 extends axially from the second lever 40 for engaging the seat back 12. More specifically, a guide bracket 150 extends from the seat back 12 having an arcuate slot 151 for receiving the guide pin 144. The guide pin 144 extends axially through the slot 151 for sliding engagement therein. The slot 151 is disposed between forward and rearward notches 152, 153 each adapted to receive the guide pin 144 when the seat back 12 is in the stowed and reclined seating positions, respectively.

Figure 7:
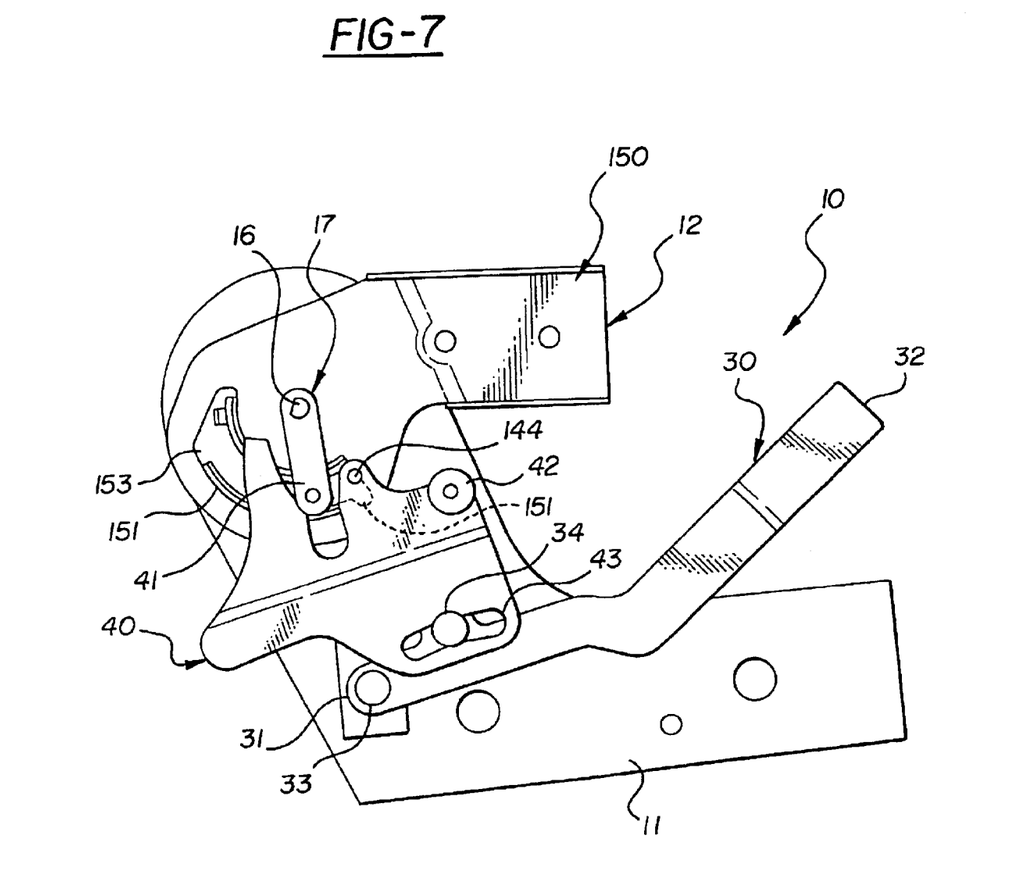
FIG. 7 is an enlarged side view of the mechanism according to the second embodiment with the seat back in the stowed position.
Figure 8:
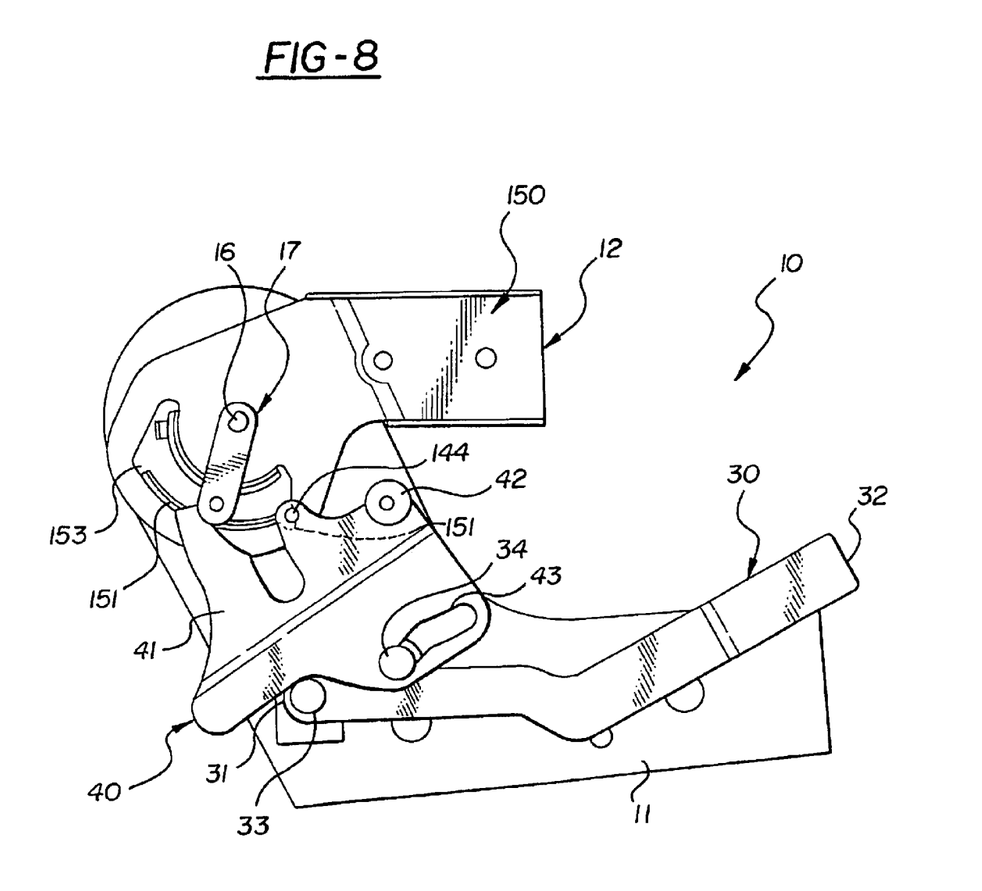
FIG. 8 is an enlarged side view of the mechanism according to the second embodiment with the seat back locked in the stowed position.

In use, the guide pin 144 is seated in the rearward notch 153 when the seat back 12 is locked in the reclined seating position. When the second lever 40 is moved to the released position, as shown in FIGS. 6 and 7, either directly or indirectly through the first lever 30, the guide pin 144 is removed from the rearward notch 153 and presented for engaging the slot 151. As the seat back 12 is moved from the reclined seating position to the stowed position, the guide pin 144 slides within the slot 151 towards the forward notch 152. The guide pin 144 while engaged with the arcuate slot 151 maintains the second lever 40 in the unreleased position. In turn, the input shaft 16 is also held in the respective unreleased position, ultimately maintaining the recliner assembly 13 in the unlocked state. The seat back 12 can continue moving towards the stowed position without manually holding either the first lever 30 or the second lever 40 in the released position. When the seat back 12 reaches the stowed position, shown in FIG. 8, the guide pin 144 enters the forward notch 152 to allow the first and second levers 30, 40 to return to the respective unreleased positions. The recliner assembly 13 returns to the locked state to lock the seat back 12 in the stowed position.

Similarly, to return the seat back 12 from the stowed position to the reclined seating position, the second lever 40 is moved to the released position to actuate the recliner assembly 13 to the unlocked state. As the seat back 12 is moved towards the reclined seating position, the guide pin 144 engages the slot 151 to maintain the second lever 40 in the released position. Once the seat back 12 reaches the reclined seating position, as shown in FIG. 5, the guide pin 144 enters the rearward notch 153 to allow the first and second levers 30, 40 to return to the respective unreleased positions. The recliner assembly 13 returns to the locked state and locks the seat back 12 in the reclined seating position.

Figure 9:
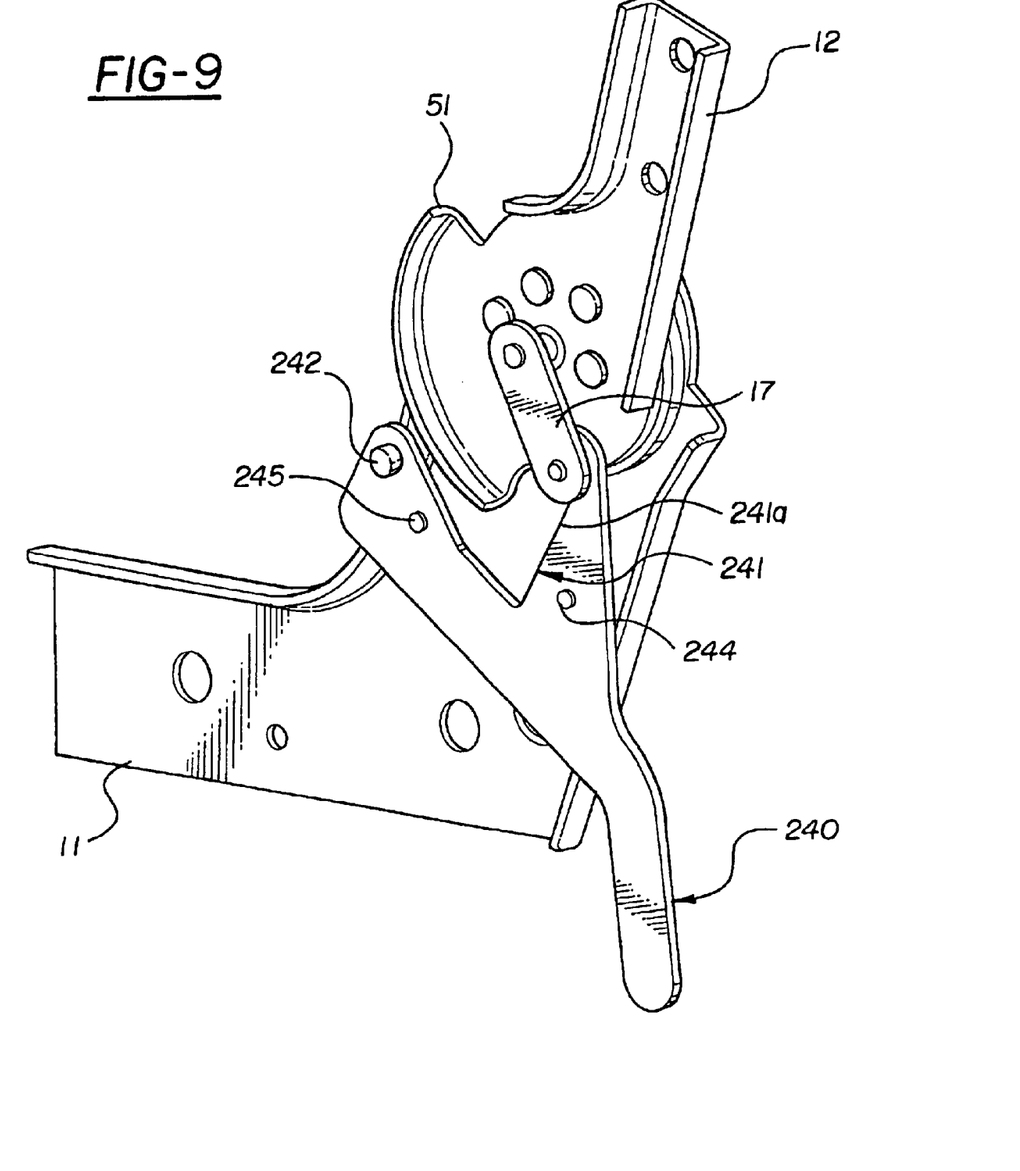
FIG. 9 is a perspective view of the mechanism for externally acuating the recliner assembly, according to a third embodiment of the invention, with the seat back in a reclined seating position.

FIG. 9 discloses a second alternative embodiment of the invention. A dump lever 240 pivotally mounted to the seat cushion 11 by a pivot pin 242 extends generally rearwardly for movement between unreleased and released positions. The dump lever 240 is further moveable between the released position and an extended position, wherein the dump lever 240 remotely releases the floor latching mechanism through a bowden cable or any other suitable remote means. A cam surface 241 extending between upper and lower portions 241a and 241b is formed in the dump lever 240. The cam surface 241 actuates the recliner assembly 13 through engagement with the lever arm 17. A rivet 244 fixedly secured to the dump lever 240 is presented for engaging the flanged guide 51 when the dump lever 240 is in the released position. The rivet 244 engages the flanged guide 51 as the seat back 12 rotates between the full forward reclined seating position A1 and the stowed position B, as illustrated in FIG. 1, to maintain the dump lever 240 in the released position, and in turn, the recliner assembly 13 in the unlocked state. A stop rivet 245 is fixedly secured to the dump lever 240 for engaging the flanged guide 51 while the seat back 12 is adjusted between the reclined seating positions A, A1, A2. The stop rivet 245 engages the flanged guide 51 to prevent movement of the dump lever 240 to the extended position while adjusting the seat back 12 between the reclined seating positions A, A1, A2.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A seat assembly for supporting an occupant within an automotive vehicle, said seat assembly comprising:

a seat cushion;

a seat back pivotally interconnected to said seat cushion for movement relative to said seat cushion between a plurality of seating positions and a stowed position overlying said seat cushion;

a recliner assembly coupled between said seat cushion and said seat back and operable between a locked state preventing pivotal movement of said seat back relative to said seat cushion and an unlocked state allowing pivotal movement of said seat back relative to said seat cushion;

a lever pivotally assembled to said seat cushion for movement between an unreleased position and a released position and operatively interconnected to said recliner assembly for actuating said recliner assembly between said locked state and said unlocked state when moving said lever between said unreleased position and said released position;

a bracket extending from said seat back for movement therewith and engagable with said lever in the released position during movement of said seat back between said plurality of seating positions and said stowed position to maintain said lever in said released position; and a latch mechanism for releasably interlocking said seat cushion to the vehicle, wherein said lever is movable between an extended position for releasing said latching mechanism and either of said unreleased position and said released position for locking said latching mechanism.

2. A seat assembly as set forth in claim 1 including a lever arm extending from said recliner assembly allowing external actuation of said recliner assembly between said locked state and said unlocked state.

3. A seat assembly as set forth in claim 2 wherein said lever includes a cam surface engagable with said lever arm to externally actuate said recliner assembly between said locked state and said unlocked state during movement of said lever between said unreleased position and said released position, respectively.

4. A seat assembly as set forth in claim 3 wherein said bracket includes a flanged guide engagable with said lever in said released position during movement of said seat back between said plurality of seating positions and said stowed position to maintain said lever in said released position.

5. A seat assembly as set forth in claim 4 wherein said lever includes a tab projecting outwardly therefrom engagable with said guide during movement of said seat back between said plurality of seating positions and said stowed position to maintain said lever in said released position.

6. A seat assembly as set forth in claim 5 including a handle extending between a distal end and an opposite proximal end pivotally assembled to said seat cushion for movement of said handle between an unreleased position and a released position, said handle having a guide pin extending axially therefrom engagable with said lever to actuate said lever between said unreleased and released positions in response to movement of said handle between said respective unreleased and released positions.

7. A seat assembly as set forth in claim 6 wherein said lever includes a guide slot adapted to receive said guide pin of said handle therethrough, said guide slot presenting edges engagable with said guide pin of said handle during movement of said lever and said handle between said respective unreleased and released positions.

8. A seat assembly as set forth in claim 7 wherein said lever includes a stop projecting axially therefrom presented for striking said flanged guide when said seat back is positioned between any one of said plurality of seating positions, whereby said lever is confined to movement between said unreleased position and said released position.

9. A seat assembly as set forth in claim 3 wherein said bracket includes a slot adapted to engage said lever in said released position during movement of said seat back between said plurality of seating positions and said stowed position to maintain said lever in said released position.

10. A seat assembly as set forth in claim 9 including a pin extending axially from said lever through said slot in said bracket engagable with said slot during movement of said seat back between said plurality of seating positions and said stowed position to maintain said lever in said released position.

11. A seat assembly as set forth in claim 10 wherein said slot in said bracket is disposed between a rearward notch and a forward notch each adapted to receive said pin when said lever is in said unreleased position and when said seat back is locked in either one of said plurality of seating positions and said stowed position, respectively.

12. A seat assembly as set forth in claim 11 including a handle extending between a distal end and an opposite proximal end pivotally assembled to said seat cushion for movement of said handle between an unreleased position and a released position, said handle having a pin extending axially therefrom engagable with said lever to move said lever between said unreleased and released positions during movement of said handle between said respective unreleased and released positions.

13. A seat assembly for supporting an occupant within an automotive vehicle, said seat assembly comprising:

a seat cushion;

a seat back pivotally interconnected to said seat cushion for movement relative to said seat cushion between a plurality of seating position and a stowed position overlying said seat cushion;

a recliner assembly operably coupled between said seat cushion and said seat back for actuation between a locked state preventing pivotal movement of said seat back relative to said seat cushion and an unlocked stated allowing pivotal movement of said seat back relative to said seat cushion;

a lever pivotally assembled to said seat cushion for movement between an unreleased position and a released position and operatively interconnected to said recliner assembly for actuating said recliner assembly between said locked state and said unlocked state when moving said lever between said unreleased position and said released position; and a bracket extending from said seat back for movement therewith, said bracket having an arcuate guide in continuous sliding engagement with said lever in said released position during pivotal movement of said seat back between said plurality of seating positions and said stowed position to retain said lever in said released position and said recliner assembly in said unlocked state.

14. A seat assembly as set forth in claim 13 wherein said lever includes a tab projecting outwardly therefrom for continuous sliding engagement with said arcuate guide of said bracket when said lever is in said released position to retain said recliner assembly in said unlocked state during pivotal movement of said seat back between said plurality of seating positions and said stowed position.

15. A seat assembly as set forth in claim 14 further including a lever arm extending from said recliner assembly, said lever having a cam surface continuously engaged with said lever arm to externally actuate said recliner assembly between said locked and unlocked states in response to movement of said lever between said unreleased and released positions, respectively.

16. A seat assembly as set forth in claim 15 further including a handle extending between a distal end and an opposite proximal end pivotally coupled to said seat cushion for movement between a released position and an unreleased position, said handle having a guide pin extending outwardly therefrom engaged with said lever to actuate said lever between said released and unreleased positions in response to pivotal movement of said handle between said released and unreleased positions, respectively.

17. A seat assembly as set forth in claim 16 wherein said lever includes a guide slot for receiving said guide pin therein, said slot having parallel edges engagable with said guide pin for moving said lever between said released and unreleased positions in response to said pivotal movement of said handle between said released and unreleased positions, respectively.

* * * * *